No. 799,408. PATENTED SEPT. 12, 1905.
L. L. SIDWELL.
WEEDER AND CULTIVATOR.
APPLICATION FILED SEPT. 29, 1904.
2 SHEETS—SHEET 1.
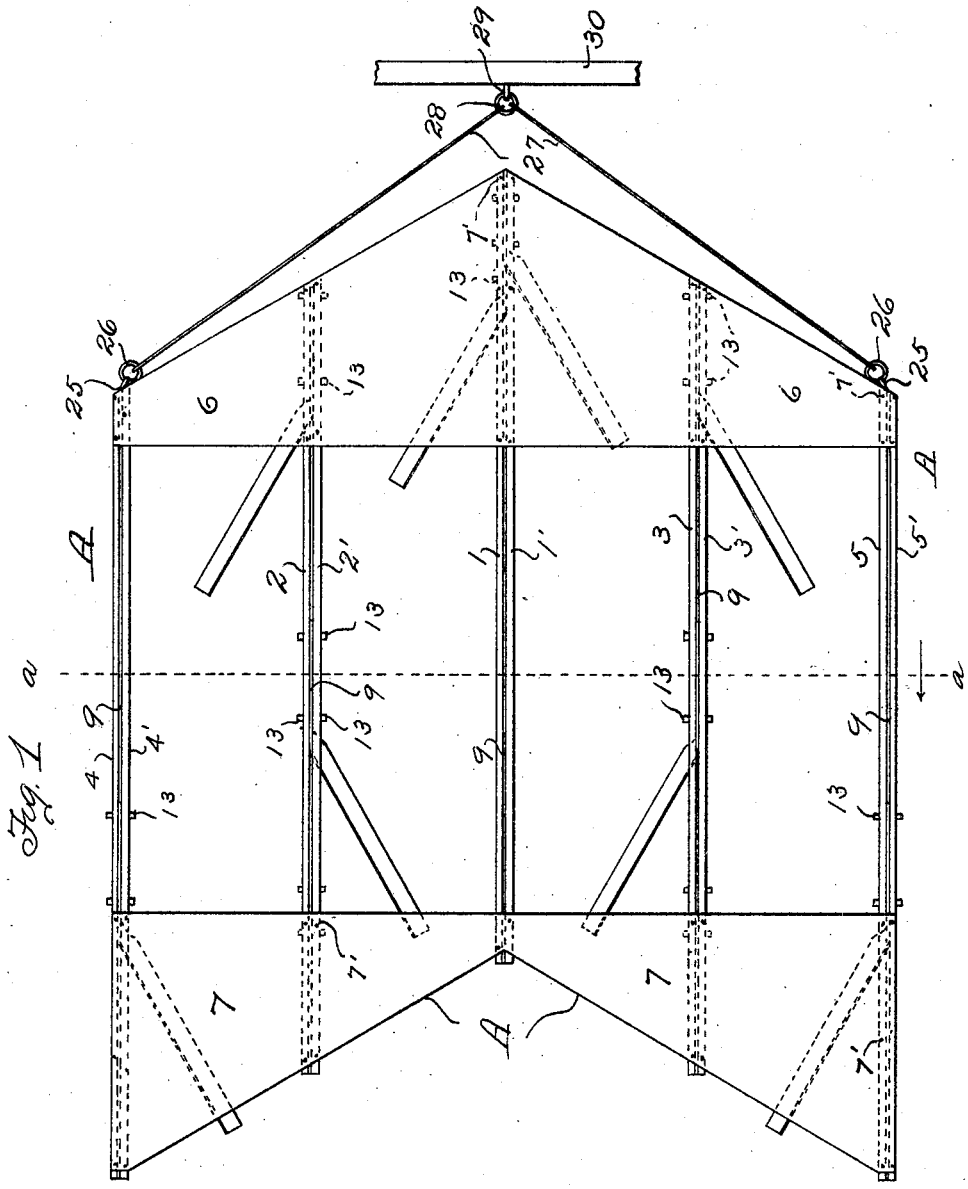

No. 799,408. PATENTED SEPT. 12, 1905.
L. L. SIDWELL.
WEEDER AND CULTIVATOR.
APPLICATION FILED SEPT. 29, 1904.
2 SHEETS—SHEET 2.
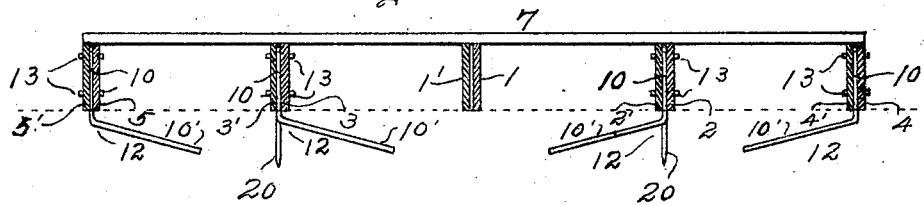
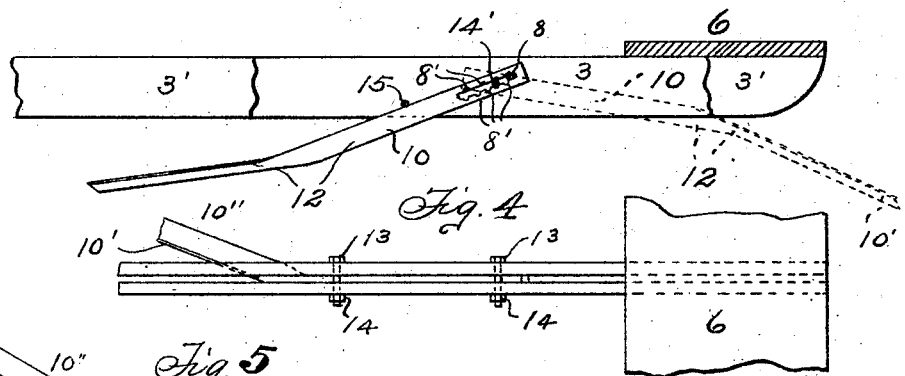
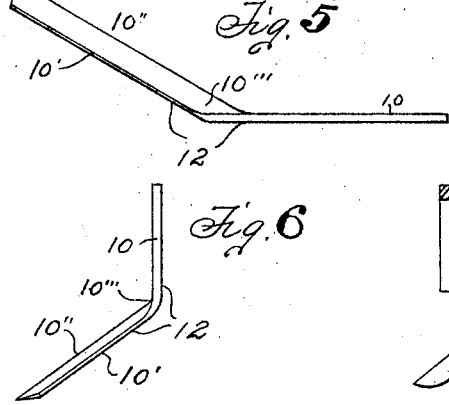
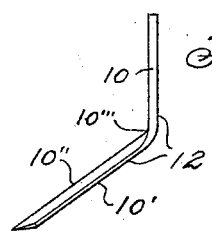
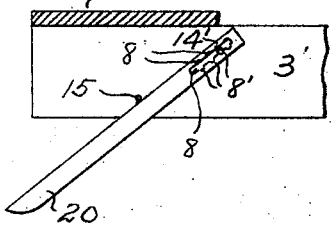
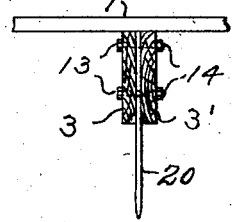
WITNESSES:
Owen G. Cates
G. H. Woodcock
INVENTOR
Lester L. Sidwell
BY
James R. Rogers
ATTORNEY

UNITED STATES PATENT OFFICE.

LESTER L. SIDWELL, OF RIVERA, CALIFORNIA.

WEEDER AND CULTIVATOR.

No. 799,408.          Specification of Letters Patent.          Patented Sept. 12, 1905.

Application filed September 29, 1904. Serial No. 226,546.

*To all whom it may concern:*

Be it known that I, LESTER L. SIDWELL, a citizen of the United States, residing at Rivera, county of Los Angeles, State of California, have invented and discovered a new and useful Improvement in Weeders and Cultivators; and I do hereby declare the following to be a full, clear, and exact description of the invention, such as will enable others skilled in the art to which it appertains to make and use the same.

This invention relates to improvements in weeders and cultivators; and the objects of my improvement are, first, to construct a frame having weed-cutting blades and earth lightening and turning blades secured thereto; second, to make the weed-cutting and earth-turning blades with devices in order to adjust them upon the frame, and, third, to provide the said blades with means whereby the blades can be removed from the frame, the said blades turned or twisted upon themselves.

The invention consists, essentially, in the construction, combination, and arrangement of the several parts, as will be hereinafter fully described in the specification, shown upon the drawings appended hereto, and specifically pointed out in the claims made a part hereof.

I attain these objects by the construction, combination, and arrangement of the several parts illustrated upon the accompanying drawings, in which—

Figure 1 is a plan view of my improved weeder and cultivator. Fig. 2 is a view in cross-section taken on the line *a a* of Fig. 1 looking in the direction of the arrow. Fig. 3 is a side elevation of a portion of one of the runners, parts thereof broken away, a weed-cutting blade secured to the runner, and a portion of the brace in cross-section. Fig. 4 is a plan view of one of the runners having one of the weed-cutting blades fastened thereto, parts of the runner, blade, and the brace for the frame broken away. Fig. 5 is a plan view of one of the weed-cutting blades. Fig. 6 is a view in elevation of one of the weed-cutting blades. Fig. 7 is a view in elevation of a portion of one of the runners having one of the earth-cutting blades secured thereto, a portion of the said runner broken away and the end brace shown in cross-section; and Fig. 8 is an end view of one of the runners having one of the earth-cutting knives secured thereto and a portion of the end brace shown in elevation.

Similar reference letters, numerals, and characters refer to like parts throughout the several views.

The reference-letter A denotes the frame of my improved weeder and cultivator. The reference-numerals 1 1' indicate the double central runner, the numerals 2 2' designate the double runner on one side of the said central runner 1 1', and the numerals 3 3' indicate the double runner on the opposite side of the said double central runner. The numerals 4 4' and 5 5' refer to the outside double side runners, which, like the said double runners, when bolted together with the cutting-blades and knives between them brace and firmly hold the said blades and knives in the desired positions. All of the said runners are constructed substantially alike, and the detailed description herein of one of the said runners will answer for the description of all of them.

The reference-numeral 6 denotes the front brace of the weeder and cultivator, and the numeral 7 the rear brace thereof. The said braces 6 and 7 are secured to the upper edges of each of the said runners by means of screws 7' 7', screw-threaded bolts and nuts, or equivalent devices, the said braces serving to retain the double runners parallel to each other.

I prefer to make my improved weeder and cultivator with five double runners. I may, however, construct them with any number of runners desirable.

The said double central runner 1 1', hereinbefore mentioned, is made by placing the flat sides or faces of the two members 1 1' approximately together and parallel with each other, leaving a narrow space 9 between said members, in which space the ends 10 10 of the weed-cutting blades 12 12 are secured by means of screw-threaded bolts and nuts 13 13 and 14 14, respectively, or equivalent devices.

The weed-cutting blades 12 12 near the ends 10 10 thereof are provided with elongated slots 8 8, having communicating recesses 8' 8', in which the pins 14' 14', connecting the adjacent members of each of said runners, are adjusted in order that the cutting-blades 12 12 can be raised or lowered to make a deep or shallow cut in the earth, as may be desirable, and, furthermore, to facilitate the removal of the said cutting-blades from the runners whenever required to sharpen the same and to provide for readily and easily cutting weeds below the surface of the ground and at the same time for lightening and turning up large areas of the earth's surface. Connecting also the said members of each of the said runners are bearing-pins 15 15, (shown upon Figs. 3 and 7 of the drawings,) against which the rear edges of the ends 10 of the cutting-blades 12 and the rear edges of the cutting-knives 20 20 bear when the said blades and knives are in operative positions.

The blades are given in their construction about a quarter-turn upon themselves in order that when the ends of the blades are secured between the said members of the runners, as above described, the cutting edge 10″ of the portion 10′ is slightly inclined downward into the earth, and the curve 10‴ permits the loosened earth in large quantities and with the least possible resistance to pass over the cutting portion 10′ of the blade in the rear thereof.

The earth-cutting knives 20 20 I preferably secure to the rear ends of the runners 2 2′, and 3 3′ are provided in a similar manner with elongated slots 8 8, connecting recesses 8′ 8′, and with connecting-pins 14′ 14′ and bearing-pins 15 15, on which the said knives can be adjusted and on which pins the said knives bear when in operative position. The rear edges of the knives 20 20 rest against the bearing-pins 15 15 (illustrated upon Fig. 7 of the drawings) when the said weeder and cultivator is being worked.

The front ends of the side runners 4 4′ and 5 5′ are provided with staples 25 25, in which the rings 26 26 or equivalent devices are connected. The said rings are connected at one end with chains 27 27, and the opposite ends of the chains are connected with the ring 28, secured to a staple 29, inserted into the whiffletree 30 or other equivalent device to which draft is applied for moving the weeder and cultivator.

It will readily appear from the foregoing description, when read in connection with the drawings hereto appended and made a part of the specification and claims, what is the operation of my improved weeder and cultivator, and further description of the mode of operating the same is deemed unnecessary.

It is obvious that many variations and changes in the details of construction, combination, and arrangement of the parts of my invention will readily suggest themselves to persons skilled in the art and still be within the spirit and scope of my improvement.

I do not desire to confine this invention to the specific construction and arrangement of parts herein shown and described, and the right is reserved to make all changes in and modifications of the same that come within the spirit of this invention; but I do desire to secure as my invention all features of construction and equivalents thereof that come within the scope of my improvement as herein shown and described, and illustrated upon the drawings appended hereto.

Having described my invention, what I do claim, and desire to secure by Letters Patent, is—

1. The weeder and cultivator comprising a double runner, the weed-cutting blade having in one end thereof an elongated slot provided with recesses communicating with said slot, a pin adapted to be operated in said slot and recesses whereby the blade can be adjusted relative to the runner.

2. The weeder and cultivator comprising double runners, means for connecting the runners together, the cutting-blades and earth-cutting knives, provided in the ends thereof with elongated slots having communicating recesses, means for adjustably securing the cutting blades and knives between the members of the runners relative to the runners.

3. The weeder and cultivator comprising a series of double runners, means for connecting the runners together, cutting-blades secured between the members of the double runners, said blades having slots near the ends thereof and provided with recesses communicating with said slots, pins adapted to operate in said slots and bearing-pins against which the said blades are adapted to press when in operative position.

4. A cultivator comprising double runners, weed-cutting blades, having the portion 10 and the portion 10′, the latter portion twisted or turned upon the former portion 10, at an angle thereto, the said portion 10 of the blades provided with an elongated slot having recesses above and below the said slot communicating therewith, a pin secured to the runners adapted to be operated in said slots and recesses of the blades for adjusting the said cutting-blades upon the runners and bearing-pins connected to the runners against which the rear edges of the blades are adapted to bear when the blades are in operative position.

In testimony whereof I have signed my name to this specification in the presence of two subscribing witnesses.

LESTER L. SIDWELL.

Witnesses:
ANNA MORGAN,
G. H. WOODCOCK.